United States Patent Office 3,514,598
Patented May 26, 1970

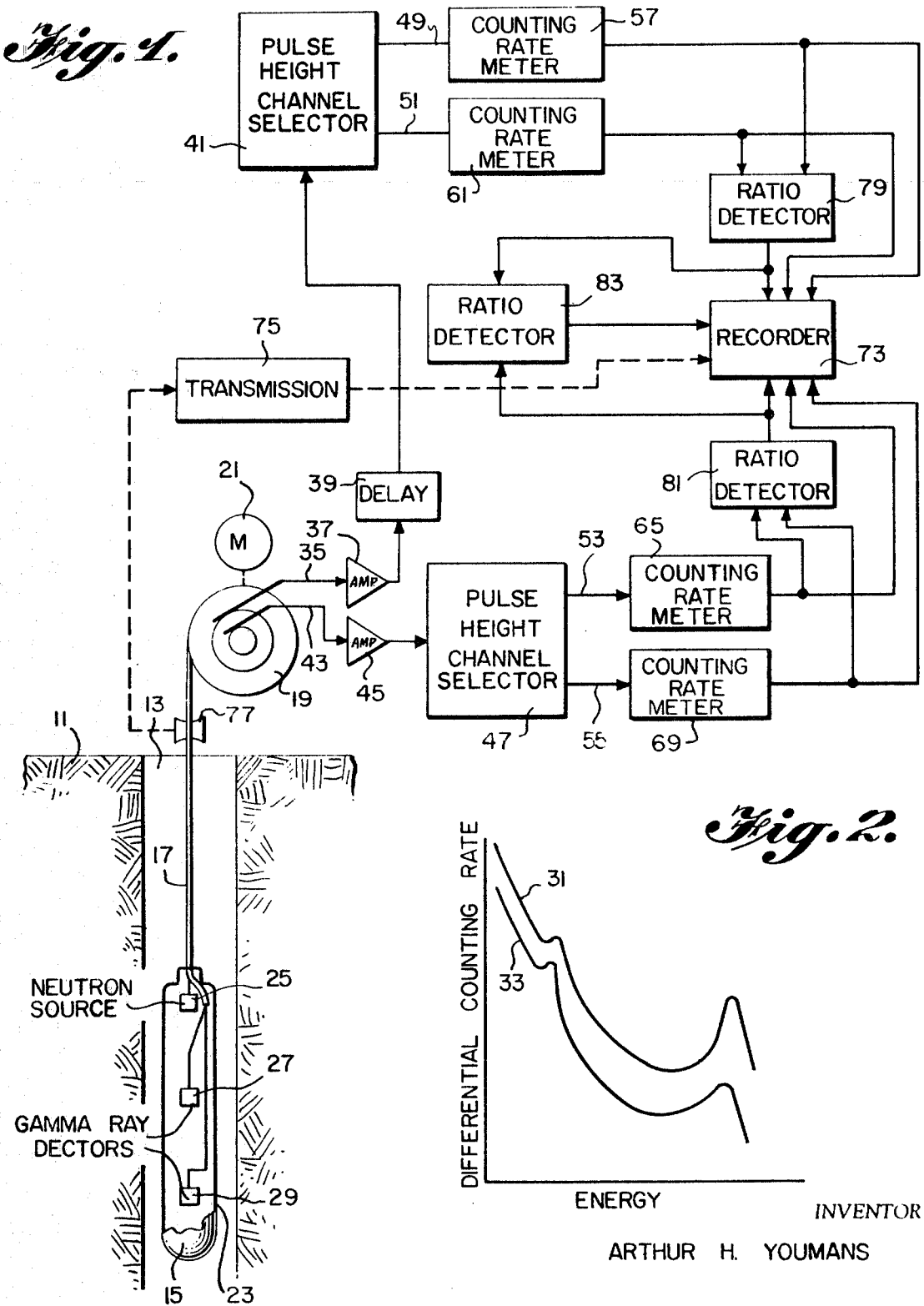

---

3,514,598
WELL LOGGING SYSTEM AND METHOD FOR DETERMINING PRESENCE OF SODIUM BY DIFFERENTIATING BETWEEN FLUORINE-20 AND NITROGEN-16
Arthur H. Youmans, Houston, Tex., assignor to Dresser Industries, Inc., Dallas, Tex., a corporation of Delaware
Filed Aug. 2, 1967, Ser. No. 657,864
Int. Cl. G01t 1/16
U.S. Cl. 250—83.3                                   8 Claims

ABSTRACT OF THE DISCLOSURE

This patent specification discloses an activation well logging system and method for determining the presence and the quantity of sodium in formations surrounding a borehole. The present invention distinguishes sodium from oxygen by virtue of the fact that fast neutron reactions with sodium produce fluorine-20, which has a half life of approximately 11 seconds and emits 1.6 mev. gamma rays, whereas with oxygen, fast neutron reactions produces nitrogen-16 which has a half life of approximately 7 seconds and emits 6 mev. gamma rays.

A well logging instrument containing a deuterium-tritium source of 14 mev. neutrons is moved continuously through the borehole. Two gamma rays detectors are positioned in the instrument to detect gamma radiation resulting from bombardment of the borehole formation by neutrons from the neutron source. A first gamma ray detector is positioned far enough from the neutron source so that the detector does not detect prompt radiation resulting from reactions of the borehole formations with the neutron bombardment. A second gamma ray detector is spaced from the first gamma ray detector by an amount such that it will detect gamma radiation from a given location in the borehole at a time equal to at least about one oxygen activation half life, or about 7 seconds, after gamma radiation is detected from such location by the first gamma ray detector.

The two gamma ray detectors produce pulse spectra corresponding to the energies of the detected gamma rays. Pulse height channel selectors are used to produce signals representing the 1.6 mev. gamma rays and the 6 mev. gamma rays detected by each detector. These signals are converted to counting rates and are recorded as a function of depth in the borehole. Also, signals representing the ratios of the two counting rates for each detector are recorded as a function of depth for both detectors. In addition, a signal representing the ratio of the two ratios is recorded also as a function of depth. These recorded signals can be compared to determine the presence and quantity of sodium.

BACKGROUND OF THE INVENTION

This invention, generally, relates to geophysical prospecting and, more particularly, to an activation logging system and method by which the presence of sodium in subsurface formations can be detected readily.

In one form of radioactivity well logging, a source of radiation, such as a neutron source, is moved through a well or borehole and the effect of the radiation on the formations is detected and recorded. The neutron bombardment of the formations will cause reactions which result in the emission of gamma rays, which can be detected and analyzed to obtain information about the subsurface formations. Also, the neutron bombardment can make some of the formation constituents radioactive. The gamma radiation resulting from this induced radioactivity can be detected to gain additional information about the formations. The use of induced radioactivity in well logging is called activation logging.

The system and method of the present invention is an activation logging system and method for detecting the presence of sodium in subsurface formations. The sodium is activated by bombardment with 14 mev. neutrons to produce fluorine-20. Fluorine-20 is radioactive, emits 1.6 mev. gamma rays and has a half life of about 11 seconds. Thus, it is feasible to detect the presence of sodium by detecting the 1.6 mev. gamma radiation produced by the sodium activation.

However, it is difficult to detect the presence of sodium in this manner because the preponderance of the activation which will result from the 14 mev. neutron bombardment of the subsurface formations will be oxygen activation, which produces 6 mev. gamma radiation which results in substantial radiation at the 1.6 mev. energy level due to scattering of the primary 6 mev. radiation and other effects in a detector. However, the activation of oxygen produces nitrogen-16, which has a half life of about 7 seconds and which is significantly less than the half life of fluorine-20. The system and method of the present invention utilizes these differences in half lives and gamma ray energies to distinguish the sodium activation from the oxygen activation.

SUMMARY OF THE INVENTION

In accordance with the present invention, a source of 14 mev. neutrons is placed in an instrument adapted to be moved through a borehole together with two gamma ray detectors spaced from the neutron source and from each other. One of the detectors is spaced far enough from the neutron source so that this detector does not detect prompt gamma rays resulting from the neutron bombardment of the formations as the instrument is moved through the borehole. A second detector is spaced from the first detector by an amount so that a time at least as long as about one oxygen activation half-life elapses between the passages of the first and second detectors by the same location in the borehole.

By comparing the rates at which gamma rays are detected by the two detectors at the 1.6 mev. and 6 mev. energy levels, sodium activation can readily by distinguished from oxygen activation because, as a result of the difference between the half lives of oxygen activation and sodium activation, the gamma radiation intensity due to sodium activation will drop off at a slower rate than the gamma radiation intensitiy due to oxygen activation, and this difference will show up in the relative rates of gamma ray detection by the two detectors.

Accordingly, an object of the present invention is to provide an improved activation well logging system and method.

Another object of the present invention is to provide a system and method for identifying the presence of sodium in subsurface formations.

Still another object of the present invention is to provide an improved method for measuring selectively the abundance of sodium and oxygen.

A further object of the present invention is to provide an activation well logging system and method in which sodium activation can be readily distinguished from oxygen activation.

A still further object of the present invention is to provide an activation well logging system and method for distinguishing sodium activation from oxygen activation making use of the fact that sodium activation results in the production of fluorine-20 which has a half life of about 11 seconds, whereas oxygen activation produces nitrogen-16 which has a half life of about 7 seconds.

Further objects and advantages of the present inven-

3 tion will become more readily apparent as the following detailed description of the invention unfolds and when taken in conjunction with the accompanying drawings.

BRIEF DESCRIPTION OF THE DRAWINGS

FIG. 1 schematically illustrates the system and method of the present invention.

FIG. 2 is a graph illustrating differential counting rates at varying energies for the two detectors of the system of the present invention, thus providing gamma ray energy spectra.

DESCRIPTION OF THE PREFERRED EMBODIMENT

In FIG. 1, a portion of the earth's crust 11 is shown schematically in vertical section. A well or borehole 13 penetrates the earth's crust 11, and a subsurface instrument 15 is disposed to be moved within the borehole. The instrument 15 is suspended within the borehole by a cable 17 which contains the necessary electrical conductors for connecting the electrical components of the instrument 15 with surface equipment.

The cable 17 is wound on a drum 19 positioned on the surface at the mouth of the borehole. By winding or unwinding the cable on the drum 19, the instrument can be raised or lowered in the borehole. A motor 21 is provided to drive the drum 19 to move the instrument through the borehole at a consent speed, preferably in the range of 20 to 30 feet per minute.

The instrument 15 has a housing 23 in which a suitable neutron source 25 is mounted near the upper end. The source 25 is preferably a deuterium-tritium ("D-T") neutron source, which produces 14 mev. neutron radiation. A D-T source is disclosed in U.S. Pat. No. 2,689,918 to A. H. Youmans. Spaced from the neutron source 25 within the housing 23 is a gamma ray detector 27, which produces output pulses having amplitudes corresponding to the energies lost in the detector by the incident gamma rays.

The gamma ray detector 27 is spaced on the order of four to six feet from the neutron source 25, which is far enough so that the detector 27 will not detect prompt gamma radiation resulting from reactions of the formations with the neutron bombardment from the source 25. A gamma ray detector 29 is mounted within the housing 23 near the bottom and is spaced on the order of two to six feet from the detector 27. This spacing is chosen so that a time equal to about one or more oxygen activation half lives, or about 7 seconds, will elapse between the passage of the detectors 27 and 29 past a given location in the borehole.

The spacing between the source 25 and the detector 29 should not be so great that substantail activation does not still remain to be detected by the detector 29 when it passes a location at which the formation has been activated by radiation from the neutron source. The detector 29 should pass by a given location six to thirty seconds after the detector 27. It will be apparent that the spacing between the detectors 27 and 29 depends upon the speed at which the instrument 15 is moved through the well by the motor 21. The gamma ray detectors 27 and 29 may, for example, be scintillation counters such as those used in the nuclear well logging system disclosed in the U.S. Pat. No. 3,257,557 to A. H. Youmans. As pointed out in the Pat. No. 3,257,557, a scintillation counter produces output pulses having amplitudes corresponding to the energies lost in the counter by the incident gamma rays.

In accordance with the present invention, the instrument 15 is moved through the borehole in an upward direction and at an approximately constant speed, preferably in the range of 20 to 30 feet per minute. As the instrument 15 is moved upwardly, the formations penetrated by the borehole are bombarded by 14 mev. neutrons from the source 25. The neutron bombardment will activate both sodium and oxygen in the formation.

4

The activation of the sodium will produce fluorine-20 which emits 1.6 mev. gamma rays and has a half life of about 11 seconds. The activation of oxygen will produce nitrogen-16 which emits 6 mev. gamma rays and has a half life of about 7 seconds. When the detectors 27 and 29 pass the locations activated by the neutron bombardment, they will detect gamma radiation emitted by the activated formations.

FIG. 2 is a graph illustrating an example of the pulse spectra produced by gamma radiation from an activated formation containing sodium and oxygen. The vertical coordinate of the graph represents the logarithm of the differential counting rates of the gamma rays, that is, the number of pulses in a selected size range per unit time produced by the gamma ray detectors. The horizontal coordinate represents pulse size according to the gamma ray energy absorbed by the detector. The curve 31 is a spectrum as might be produced by the detector 27, and the curve 33 is a spectrum as might be produced by the detector 29, from a formation containing sodium and oxygen.

A point on the curve 31 will indicate the number per unit time of gamma rays from the formation which lose a particular energy in the detector 27 when the detector 27 passes the activated location, and a point on the curve 33 will indicate the number per unit time of gamma rays from the formation which lose a particular energy in the detector 29 when the detector 29 passes the activated location. Since the detector 29 will pass the exemplary activated location at a later time than the detector 27, the spectrum 33 shows lower counting rates than the spectrum 31.

The spectra 31 and 33 each have two peaks, one corresponding to a gamma ray energy loss of 1.6 mev. and the other corresponding to a gamma ray energy loss of 6 mev. The peaks at the energy level of 1.6 mev. are largely due to gamma radiation produced by fluorine-20, and the peaks at the 6 mev. energy level are due to gamma radiation produced by the oxygen activation. The spacing between the spectra illustrates that the counting rate drops off more rapidly with time at the 6 mev. level than it does at the 1.6 mev. level.

This phenomenon occurs because fluorine-20, which produces a preponderance of the gamma radiation at the 1.6 mev. level, has a longer half life than the activated oxygen which produces the preponderance of the gamma radiation at the 6 mev. level. Among the common elements encountered in earth formations, only oxygen produces activation radiation above about 2.5 mev. Thus, not only those gamma rays at 6 mev., but also substantially all those in the entire range from 2.5 mev. to the maximum observed, can be regarded as indicative of oxygen activation.

In the absence of oxygen, for example in logging through a rock salt formation, no activation radiation above 2.5 mev. would be observed. On the other hand, elements such as silicon, aluminum and iron are to a greater or lesser extent activated by neutron irradiation, and these elements may result in the production of gamma rays having energy loss in the detector crystals which may be comparable to the 1.6 mev. produced by sodium.

Whereas a direct measurement of oxygen activation can be made to the exclusion of effects due to other elements, no comparably simple method can be employed to measure the abundance of sodium, except in the unlikely event that neither oxygen nor other interfering elements are present. To overcome this difficulty, the present invention provides a means whereby a comparison is made of the counting rates detected by the two respective detectors at the 1.6 mev. level and the 6 mev. level, so that the presence of sodium in the formations can be determined.

The pulses produced by the detector 27 in response to the incident gamma radiation pass through the cable 17 to a lead 35 on the earth's surface where the pulses are amplified by an amplifier 37 and then applied to a delay device 39. The delay device 39 delays the applied pulses for a time interval equal to the time interval between the passage of the detector 27 past a location in the borehole 13 and the passage of the detector 29 past such location as the instrument 15 is being raised at a constant speed. The delay device may, for example, be a continuously running endless magnetic tape loop with spaced recording and reproducing transducers. The delay device 39, after delaying the pulses, applies them to a pulse height channel selector 41.

The pulse height channel selector 41 selects from the spectrum of pulses from the delay device those indicative of gamma rays which lost about 1.6 mev. in the detector 27 and delivers corresponding pulses to the connecting circuit 49; it also selects from that spectrum those pulses indicative of gamma rays which lost about 6 mev. in the same detector 27 and delivers corresponding pulses to the connecting circuit 51. The pulses produced on the circuit 49 are connected to a counting rate meter 57, which produced an analog output signal having an amplitude corresponding to the rate at which the input pulses are applied on the circuit 49. The pulses on connecting circuit 51 are connected to a counting rate meter 61, which produces an analog output signal having an amplitude corresponding to the rate at which input pulses are applied on the circuit 51. Thus, the counting rate meter 57 will produce an output signal having an amplitude indicative of the rate at which gamma rays lose 1.6 mev. to the detector 27, and the counting rate meter 61 will produce an output signal having an amplitude corresponding to the rate at which gamma rays lose 6 mev. to the same detector 27.

The pulses produced by the detector 29 in response to the incident gamma radiation also are applied through the cable 17 via a separate channel to a lead 43 on the earth's surface where the pulses are amplified by an amplifier 45 and applied to a pulse height channel selector 47. The pulse height channel selector 47 delivers output pulses corresponding to the gamma rays which lost about 1.6 mev. in the detector 29 to a connecting circuit 53 and delivers output pulses corresponding to the gamma rays which lost about 6 mev. in the same detector 29 to a connecting circuit 55.

The pulses produced on the circuit 53 are connected to a counting rate meter 65, which produces an analog output signal having an amplitude corresponding to the frequency of the applied pulses. Thus, the counting rate meter 65 will produce an output signal having an amplitude corresponding to the rate at which gamma rays lose 1.6 mev. to the detector 29. The pulses produced on circuit 55 are connected to a counting rate meter 69 which produces an analog output signal having an amplitude corresponding to the frequency of the applied pulses. Accordingly, the output signal of the counting rate meter 69 will have an amplitude corresponding to the rate at which gamma rays lose about 6 mev. to the same detector 29.

The analog output signals produced by the counting rate meters 57, 61, 65 and 69 are applied to a recorder 73 where they are recorded continuously in correlation with the depth of instrument 15 as the instrument 15 is raised through the borehole. The recorder 73 is driven through a transmission 75 by a measuring reel 77, over which the cable 17 is drawn, so that the recorder 73 moves in correlation with depth as the instrument 15 is raised through the borehole. Because of the delay provided by the delay device 39, the output signals of the counting rate meters 57 and 61 will correspond in depth to the output signals currently being produced by the counting rate meters 65 and 69; that is, the output signal amplitudes at any given instant will represent counting rates from the same depth or location in the borehole. After the output signals of the counting rate meters are recorded by the recorder 73, they may be examined visually and intercompared to determine the presence of sodium and oxygen.

The two curves produced by recording respectively the outputs of rate meters 61 and 69 are oxygen activation logs as described in the prior art. That is, each is a continuous record versus depth of the intensity of oxygen activation radiation and, as such, provides a means of measuring the oxygen concentration.

In order for either or both of the respective curves to provide meaningful information about the oxygen content of the formation, it is essential that the neutron source operate with a constant, uniform output intensity and that the speed of movement through the borehole be constant. The present invention provides a means of determining whether or not the instrument speed is constant and, thereby, improves the utility of the oxygen log. This is accomplished by intercomparing the said two curves.

It will be apparent that the curve produced by detector 29 will always have a smaller counting rate than that produced by detector 27 and that the two curves will always have a constant ratio if the instrument moves at a uniform speed. If a change or variation in speed occurs, then it is apparent that both detectors will respond differently than would have been the case at uniform speed; and the relative change of the respective detector signals will not be the same. This occurs because the delay between irradiation by the source and measurement by the respective detectors is in a constant ratio only when the instrument moves at uniform speed.

Therefore, whenever the instrument changes speed, the curves produced while logging the intervals between the source and the respective detectors will be altered, the degree of alteration depending on the circumstances but being in general different for the two detectors. Thus, the two curves will be in constant ratio to one another only when the logging instrument moves at a constant speed.

If then the two curves are recorded in such a way as to fall generally one on top of the other at uniform speed, it will be immediately apparent when fluctuations in speed occur in that the two curves will depart from one another. When this occurs, as for example when the instrument momentarily is obstructed or stuck in its passage through the borehole, the fact that an erroneous reading has been obtained will be immediately apparent from the fact that the two oxygen curves depart from one another. In such case, the particular section of the log may be disregarded, or the instrument may be lowered again to a point below the zone in question and the operation repeated until a satisfactory measurement is obtained.

By the same token, the curves produced by rate meters 57 and 65, respectively, may be assumed to be erroneous due to instrument speed variations whenever the oxygen curves depart from one another as explained above. Thus, the oxygen curves serve as a monitor of quality of all the activation measurements herein described, since all activation measurements are influenced adversely by uncontrolled instrument speed variations.

The output signals of the counting rate meters 57 and 61 are applied to a ratio detector 79, which produces an output signal having an amplitude that is proportional to the ratio of the amplitude of the output signal of the counting rate meter 57 to the amplitude of the output signal of the counting rate meter 61. Thus, the output signal of the ratio detector 79 will represent the ratio of the gamma radiation which lost 1.6 mev. in the detector 27 to the gamma radiation which lost 6 mev. in the detector 27.

The output signal of the counting rate meters 65 and 69 are applied to a ratio detector 81, which produces an output signal having an amplitude proportional to the ratio of the amplitude of the output signal of the counting rate meter 65 to the amplitude of the output signal of the counting rate meter 69. Thus, the ratio detector 81 will produce an output signal having an amplitude indicative of the ratio of the gamma radiation which lost 1.6 mev. in the detector 29 to the gamma radiation which lost 6 mev. in the same detector 29.

If there is no sodium present in the formation through which the instrument 15 is passing, the ratio of the detected counting rate at the 1.6 mev. level to the detected counting rate at the 6 mev. level will stay relatively about the same for both of the detectors 27 and 29. When the instrument comes to a location containing sodium, the ratio of the counting rates detected by the detector 29 will increase relative to the ratio of the counting rates detected by the detector 27 because the counting rate at the 1.6 mev. level will decay more slowly than at the 6 mev. level when sodium is present due to the fact that fluorine-20 produced by the sodium activation has a greater half life than the activated oxygen.

Moreover, the magnitude of the ratio of the counting rates detected by the detector 29 relative to the ratio of the counting rates detected by the detector 27 will be indicative of the quantity of sodium present at a given activated location. Thus, the amplitudes of the output signals of the ratio detectors 79 and 81 can be compared to detect the presence of sodium in the formations surrounding the borehole and traversed by the instrument 15. The output signals of the ratio detectors 79 and 81 are recored by the recorder 73 as a function of depth for visual comparison so that the quantity of sodium present at different depths may be determined readily.

The output signals of the ratio detectors 79 and 81 also are applied to a ratio detector 83, which produces an output signal proportional to the ratio of the amplitude of the output signal of the ratio detector 79 to the amplitude of the output signal of the ratio detector 81. As pointed out previously, the amplitude of the output signal of the ratio detector 79 relative to the amplitude of the output signal of the ratio detector 81 will vary in accordance with the relative amount of sodium in the activated location giving rise to the counting rates from which the output signals of the ratio detectors 79 and 81 are derived.

Accordingly, the amplitude of the output signal 83 will provide a direct indication of the relative amount of sodium present. This signal is recorded as a function of depth by the recorder 73 also.

The ratio detectors 79, 81 and 83 may conveniently be variable gain amplifiers with the signal representing the numerator of the ratio to be determined being applied to the input of the amplifier and the gain of the amplifier being controlled inversely in accordance with the denominator of the ratio to be determined. Alternatively, each of the ratio detectors may be an analog multiplying circuit in combination with an inverter for inverting one of the input signals to be applied to the multiplying circuit.

The surface portion of the system of the present invention may be simplified by eliminating the ratio detectors 79, 81 and 83 and simply recording the output signals of the counting rate meters. Alternatively, the recorder could record just the output signals of the ratio detectors 79 and 81, eliminating the ratio detector 83 and eliminating the recording of the output signals of the counting rate meters. In either of such a simplified system, the delay device 39 could be eliminated, and the desired delay could be provided by properly positioning the recording transducers recording signals derived from the gamma ray detector 29 relative to the transducers recording the signals derived from the gamma ray detector 27.

For example, if the output signals of the ratio detectors 79 and 81 are to be recorded, the transducer recording the output signal of the ratio detector 79 would be spaced from the transducer recording the output signal of the ratio detector 81 in the direction of travel of the recording medium by an amount such that the two recorded signals would both be properly positioned as a function of depth.

Another alternative simplification of the system would be to record the output signal of the ratio detector 83 as a function of depth without making any provision for recording the output signals of the counting rate meters or the ratio detectors 79 and 81.

In those instances when variations in speed of the instrument 23 presents serious problems, it is preferred to record the ratio of the output of rate meter 57 to the output of rate meter 65 as well as the ratio of rate meter 61 to rate meter 69. The latter ratio provides an indication of the relative intensity of 6 mev. radiation at the two detectors, whereas the former provides an indication of the relative intensity of 1.6 mev. radiation at the two detectors.

As explained previously, the ratio of the outputs of rate meters 61 and 69 must remain constant if the instrument moves at a constant speed, whereas the ratio of the output of rate meter 57 to that of rate meter 65 varies with variations in sodium content.

A modification of the system may include the provision of a delay means whereby the signals from the respective detectors reach the respective ratio detectors in proper synchronism with depth of the detectors in the borehole. It will be apparent that the required delay of the signals from detector 27 may be effected by delaying the outputs of rate meters 57 and 61 with a suitable analog delay device.

These and many other modifications may be made to the above described specific embodiment of the present invention without departing from the spirit and scope of the invention.

The embodiments of the invention in which an exclusive property or privilege is claimed are defined as follows:

1. A method of determining the presence of sodium at a location beneath the surface of the earth comprising the steps of:
   irradiating the formations at said location with neutrons;
   measuring the rate of emission of gamma radiation from said location resulting from said step of irradiating during a first time interval after said step of irradiating; and
   measuring again the rate of emission of gamma radiation from said location resulting from said step of irradiating during a second time interval after said first-mentioned step of measuring, said second time interval being at least as long a time as one oxygen activation half-life but sufficiently short so that substantial gamma radiation from said location still exists as a result of said step of irradiating at the end of said second time interval, wherein said first and second mentioned steps of measuring both comprise measuring the rate of emission of gamma radiation at about the 1.6 mev. level and the rate of emission of gamma radiation at about the 6 mev. level.

2. A well logging method for determining the presence of sodium in formations surrounding a borehole comprising the steps of traversing said borehole with a neutron source to irradiate said formations and thereby activate the said formations, measuring the rate of emission of gamma radiation from said formations resulting from the activation of said formations, and measuring again the rate of emission of gamma radiation from said formations resulting from the activation of said formations following said first-mentioned step of measuring, said second-mentioned step of measuring being carried out along said borehole at least about one oxygen half-life after said first-mentioned step of measuring for such location and being soon enough for said locations to measure substantial radiation resulting from the activation of the formations at said location, wherein said first-mentioned step of measuring comprises the step of traversing said borehole with a gamma ray detector following the traversal of said borehole with said neutron source and said second-mentioned step of measuring comprises traversing said borehole with a gamma ray detector following the traversal of said borehole with said first-mentioned gamma ray detector, and wherein said first and second mentioned steps of measuring both comprise measuring the rate of gamma radiation at about the 1.6 mev. level and the rate of gamma radiation at about the 6 mev. energy level.

3. A well logging system comprising an instrument adapted to be moved through a borehole including a neutron source for irradiating the formations surrounding said borehole to activate said formations and means to measure gamma radiation from formations at a location in said borehole activated by radiation from said neutron source during a first time interval after said location is irradiated by said source and after a second time interval commencing at the end of said first time interval, said second time interval being at least one oxygen half-life in length but being sufficiently short that substantial gamma radiation from said location resulting from irradiation by said neutron source still exists at the end of said second time interval, said means to measure gamma radiation including means to measure the rate of gamma radiation at about the 1.6 mev. energy level and the rate of gamma radiation at about the 6 mev. energy level at the ends of both of said first and second time intervals.

4. A well logging system as recited in claim 3 wherein there is provided means for recording said rates of gamma radiation at said 1.6 mev. energy level and said 6 mev. energy level at the ends of both of said time intervals as a function of depth in said borehole.

5. A well logging system as recited in claim 4 wherein there is provided means to generate a signal representing a first ratio between the rates of gamma radiation at about said 1.6 mev. level and at about said 6 mev. level at the end of said first time interval and means to generate a signal representing a second ratio between the rates of gamma radiation at about said 1.6 mev. level and at about said 6 mev. level at the end of said second time interval.

6. A well logging system as recited in claim 5 wherein there is provided means to record said signals representing said ratios as a function of depth in said borehole.

7. A well logging system as recited in claim 5 wherein there is provided means to generate a signal representing a third ratio between the signals representing said first and second ratios.

8. A well logging system as recited in claim 7 wherein there is provided means to record the signal representing said third ratio as a function of depth in said borehole.

References Cited

UNITED STATES PATENTS

| 2,948,810 | 8/1960 | Caldwell et al. |
| 3,035,174 | 5/1962 | Turner et al. |

OTHER REFERENCES

Wakil, M. M.: Nuclear Power Engineering, McGraw-Hill Book Co. Inc., N.Y., p. 435, 1962.

Caldwell, R. L.: "Nuclear Physics," World Petroleum, April 1965, vol. 27, No. 4, pp. 59–63.

RALPH G. NILSON, Primary Examiner

MORTON J. FROME, Assistant Examiner

U.S. Cl. X.R.

250—83.6